United States Patent
Kelly et al.

(10) Patent No.: US 8,527,808 B2
(45) Date of Patent: *Sep. 3, 2013

(54) DMI REDUNDANCY IN MULTIPLE PROCESSOR COMPUTER SYSTEMS

(75) Inventors: Brian Kelly, Portland, OR (US); Michael J. Kasper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,054

(22) Filed: Jan. 23, 2012

(65) Prior Publication Data

US 2012/0124416 A1    May 17, 2012

Related U.S. Application Data

(63) Continuation of application No. 12/644,540, filed on Dec. 22, 2009, now Pat. No. 8,117,494.

(51) Int. Cl.
*G06F 11/00*    (2006.01)

(52) U.S. Cl.
USPC .......................... 714/11; 714/4.11

(58) Field of Classification Search
USPC .................. 714/4.11, 4.12, 4.3, 10–13, 4.1
See application file for complete search history.

(56) References Cited

U.S. PATENT DOCUMENTS

| | | | |
|---|---|---|---|
| 5,491,788 A | 2/1996 | Cepulis et al. | |
| 5,574,929 A | 11/1996 | Pieterse et al. | |
| 2003/0005275 A1 | 1/2003 | Lam | |
| 2005/0066218 A1 | 3/2005 | Stachura et al. | |
| 2006/0106958 A1* | 5/2006 | Khawand et al. | 710/52 |
| 2006/0136915 A1 | 6/2006 | Aingaran et al. | |
| 2009/0240981 A1 | 9/2009 | Tra et al. | |
| 2009/0254698 A1 | 10/2009 | Kwon et al. | |
| 2009/0259884 A1 | 10/2009 | Duron et al. | |
| 2011/0026411 A1 | 2/2011 | Hao | |

FOREIGN PATENT DOCUMENTS

| | | |
|---|---|---|
| JP | 2007-066216 | 3/2007 |
| JP | 2007-157060 | 6/2007 |

OTHER PUBLICATIONS

International Search Report and Written Opinion mailed Aug. 30, 2011, for PCT/US2010/058243.
European Search Report, EP 10252158, Dec. 5, 2012, a total of 3 pages.
European Search Report, Dec. 13, 2012, total of 3 pages.
Communication pursuant to Article 94(3) EPC, Jan. 10, 2013, total of 6 pages.
Japanese Office Action, Japanese Application No. 2010-262354, mail date: Feb. 5, 2013, total of 4 pages.
Itoh et al., Japanese Office Action, Japanese Application No. 2010-262354, mail date: Oct. 23, 2012, total of 7 pages.

* cited by examiner

*Primary Examiner* — Dieu-Minh Le
(74) *Attorney, Agent, or Firm* — Pillsbury Winthrop Shaw Pittman LLP

(57) ABSTRACT

In accordance with various aspects of the disclosure, a method and apparatus are disclosed that includes aspects of monitoring a first processor of a computer by a monitoring module for a first processor instability; determining if the first processor is stable based on the monitored first processor instability; routing operational priority to a second processor of the computer through a multiplexer module if the first processor is determined not to be stable, wherein a first interface of the first processor and a second interface of the second processor are in communication with the multiplexer module and wherein the first processor and the second processor are in communication by a processor interconnect; and operating the computer using the second processor.

17 Claims, 4 Drawing Sheets

DMI REDUNDANCY IN MULTIPLE PROCESSOR COMPUTER SYSTEMS

PRIORITY

This application claims the benefit under 35 U.S.C. §120 as a continuation of U.S. application Ser. No. 12/644,540, now U.S. Pat. No. 8,117,494, entitled "DMI REDUNDANCY IN MULTIPLE PROCESSOR COMPUTER SYSTEMS" and filed Dec. 22, 2009, the entire content of which is incorporated herein by reference.

BACKGROUND

This disclosure relates generally to the field of multiple processor computer platforms, and more particularly to an apparatus, system and method for desktop management interface (DMI) redundancy in a multiple processor computer system.

Computer systems can have a single (unitary) processor (UP) or multiple processor configuration. One type of multiple processor configuration is a dual processor (DP) configuration. In a multiple processor configuration, typically one of the processor is designated a boot processor, whereby when the computer system is booted, the boot processor is the only processor involved in the boot process. If the boot processor fails to boot the computer system, the computer is typically non-function unless other measures are taken. What is needed is multiple processer computer system that is enabled to determine if the boot processor is functioning properly, and if not, designating another processor to be the boot processor.

DETAILED DESCRIPTION

Figure 2:
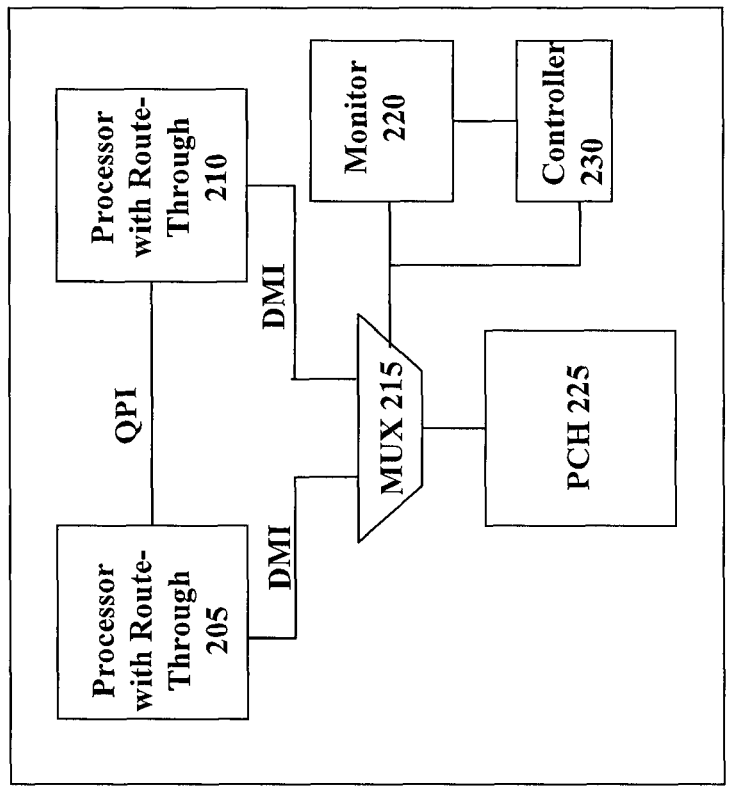
FIG. 2 shows an example of a multiple processor platform having a dual processor (DP) topology in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a method is disclosed that comprises aspects of monitoring a first processor of a computer by a monitoring module for a first processor instability; determining if the first processor is stable based on the monitored first processor instability; routing operational priority to a second processor of the computer through a multiplexer module if the first processor is determined not to be stable, wherein a first desktop management interface of the first processor and a second desktop management interface of the second processor are in communication with the multiplexer module and wherein the first processor and the second processor are in communication by a processor interconnect; and operating the computer using the second processor.

In accordance with various embodiments of this disclosure, an apparatus is disclosed that comprises aspects of a first processor; a second processor configured to be in communication with the first processor through an interconnect; and a multiplexer configured to multiplex a first desktop management interface of the first processor and a second desktop management interface of the second processor into a platform controller hub.

In accordance with various embodiments of this disclosure, an apparatus is disclosed that comprises aspects of a computer including a board, the board including a first processor; a second processor configured to be in communication with the first processor through an interconnect; and a multiplexer configured to multiplex a first desktop management interface of the first processor and a second desktop management interface of the second processor connected to a platform controller hub.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 1:
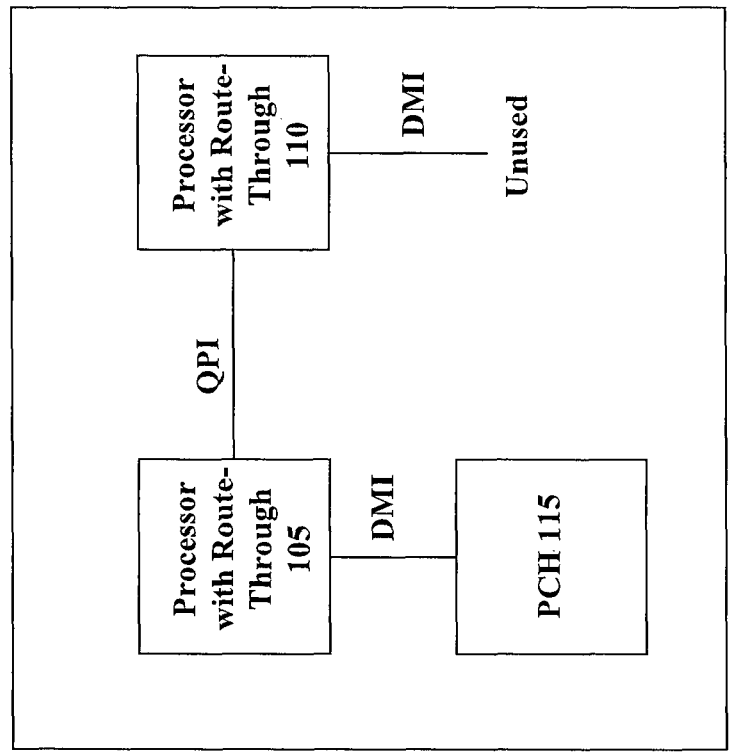
FIG. 1 shows an example related processor topology.

FIG. 1 shows an example related processor topology. Two processors, 105 and 110, are connected through an interconnect, such as a point-to-point processor interconnect like QuickPath Interconnect (QPI) by Intel. A Desktop Management Interface (DMI) of processor 105 is connected to a Platform Control HUB (PCH) 115, while a DMI of processor 110 is unused. A PCH, also known as an I/O Controller Hub (ICH) or Southbridge, is a chip that implements the "slower" capabilities of the motherboard (not shown) in a northbridge/southbridge chipset computer architecture. Typically, the southbridge can be distinguished from the northbridge by not being directly connected to the CPU. Rather, the northbridge ties the southbridge to the CPU. Through the use of controller integrated channel circuitry, the northbridge can directly link signals from the input/output (I/O) units to the CPU for data control and access.

In multiple processor platforms, the processors can be route-through enabled processors. Route-through is a packet routing mechanism within the uncore of certain processors. The term "uncore" refers to components of a multi-core chip other than the cores (e.g., the interconnect for the cores, the bus interfaces, etc.). Changes in the internal blocks (CSI home logic, Source Address Decode Blocks, Global Queue, etc) are used to determine the destination of the packets. Instead of processing the packet at each node, the destination node is determined and either 'route through' or process based on the destination address.

FIG. 2 shows an example of a multiple processor platform having a dual processor (DP) topology in accordance with various aspects of the present disclosure. In this example, two processors, 205 and 210, can be connected through an interconnect, such as a point-to-point processor interconnect. For example, the point-to-point interconnect can be a QPI; however, other suitable processor interconnects may be used. As shown in FIG. 2, processors 205 and 210 are both route-through enabled processors; however, this is merely an example platform configuration. The processors need not be route-through enabled. Upon initial configuration, one of the two processor 205 or 210 can be selected to be a boot processor. A DMI of processor 205 and a DMI of processor 210 can be connected to inputs of multiplexer MUX 215. A monitor 220 can be in communication with MUX 215 and can be configured to monitor a condition of the boot processor. A controller 230 can in communication with the monitor 220, MUX 215 or both and be configured to instruct the MUX 215 to designate the non-boot processor to be the boot processor based on the conditioned monitored by the monitor 220. The output of MUX 215 can be in communication with a PCH 225.

Figure 3:
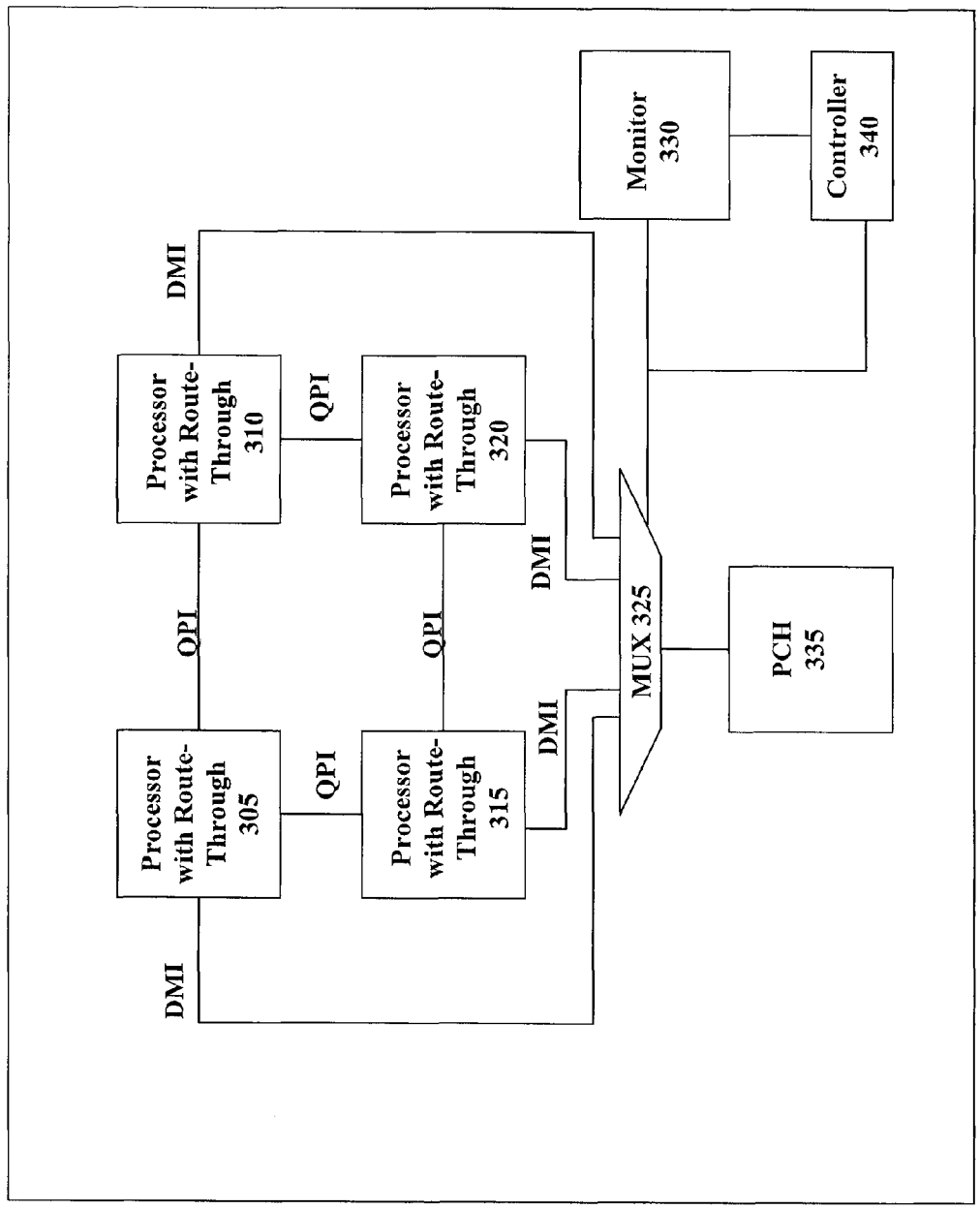
FIG. 3 shows another example of a multiple processor platform having quad processor topology in accordance with various aspects of the present disclosure.

FIG. 3 shows another example of a multiple processor platform having quad processor topology in accordance with various aspects of the present disclosure. In this example, four processors, 305, 310, 315 and 320, can be connected through an interconnect, such as a point-to-point processor interconnect. For example, the point-to-point interconnect can be a QPI; however, other suitable processor interconnects may be used. As shown in FIG. 3, processors 305, 310, 315 and 320 are route-through enabled processors; however, this is merely an example platform configuration. The processors need not be route-through enabled. Upon initial configuration, one of the four processor 205 or 210 can be selected to be a boot processor. DMI of processors 305, 310, 315 and 320 can be connected to inputs of multiplexer MUX 325. A monitor 320 can be in communication with MUX 315 and can be configured to monitor a condition of the boot processor. A controller 340 can in communication with the monitor 320, MUX 315 or both and be configured to instruct the MUX 315 to designate a non-boot processor to be the boot processor based on the conditioned monitored by the monitor 320. Output of MUX 325 can be in communication with a PCH 335.

In some aspects, the monitor 220, 320 can be a timer, a watchdog timer or a baseboard management controller, or a discrete state machine. For example, a watchdog timer can be a computer hardware timing device that is configured to trigger a system reset if the boot processor, due to some fault condition, such as a hang or freeze, neglects to regularly service the watchdog. A hang or freeze occurs when either the boot processor, a computer program or the whole system becomes unresponsive to user input. Hardware can cause a computer to hang, either because it is intermittent or because it is mismatched with other hardware in the computer. Also, hardware can also become defective over time due to dirt or heat damage. The watchdog can be tied directly to the MUX 215, 315 or to the controller 230, 340 or both.

In some aspects, the monitor 220, 320 can be a baseboard management controller (BMC). A BMC is a specialized microcontroller embedded on the motherboard of a computer. The BMC is the intelligence in the Intelligent Platform Management Interface (IPMI) architecture. The BMC manages the interface between system management software and platform hardware. Different types of sensors built into the computer system report to the BMC on parameters such as temperature, cooling fan speeds, power mode, operating system (OS) status, etc. The BMC monitors the sensors and can send alerts to the MUX 215, 315 or to the controller 230, 340 or both if any of the parameters do not stay within preset limits, including a potential failure of the system. A user of the computer can also communicate with the BMC to take some corrective action such as resetting or power cycling the system to get a hung OS running again. Physical interfaces to the BMC can include SMBus busses, an RS-232 serial console, address and data lines and an Intelligent Platform Bus (IPMB), that enables the BMC to accept IPMI request messages from other management controllers in the system.

In some aspects, the monitor 220, 320 can be configured to monitor and determine whether the system is stable by monitoring for various system instabilities. For example, a system instability can include whether or not the designated boot processor is able to boot properly. Other system instabilities can include whether the system is able to remain stable for a specific duration of time, such as on the order of minutes, days or weeks. The determination can be performed in a variety of manners. For example, system instability can be determined manually by a user/operation by observation of the system, using hardware and/or software implemented watchdog timers, or managed through system level logging of performance data. Other parameters can include a determination that the system is running slower as compared to a desired state, electrical instability, too memory errors for the boot processor, or too many errors on DMI or other platform interfaces local to one or more processors.

In some aspects, the boot processor configuration can be accomplished on an architecture by architecture basis. For example, various strapping options, such as combinations of inputs on the processor set in a pre-determined fashion used to provide directives to the processor to configure itself when it comes out of reset. The strapping options could be controlled by a PLD, FPGA, a manual switch, or from another logic device on the platform. In some aspects, the boot processor can be disabled on an architecture specific basis.

In some aspects, the MUX can be configured in several ways. For example, the MUX can be configured by PCH integrated Manageability Engine, onboard BMC, manually through a user interface on the front panel or through field-programmable gate array (FPGA) or a complex programmable logic device (CPLD).

Figure 4:
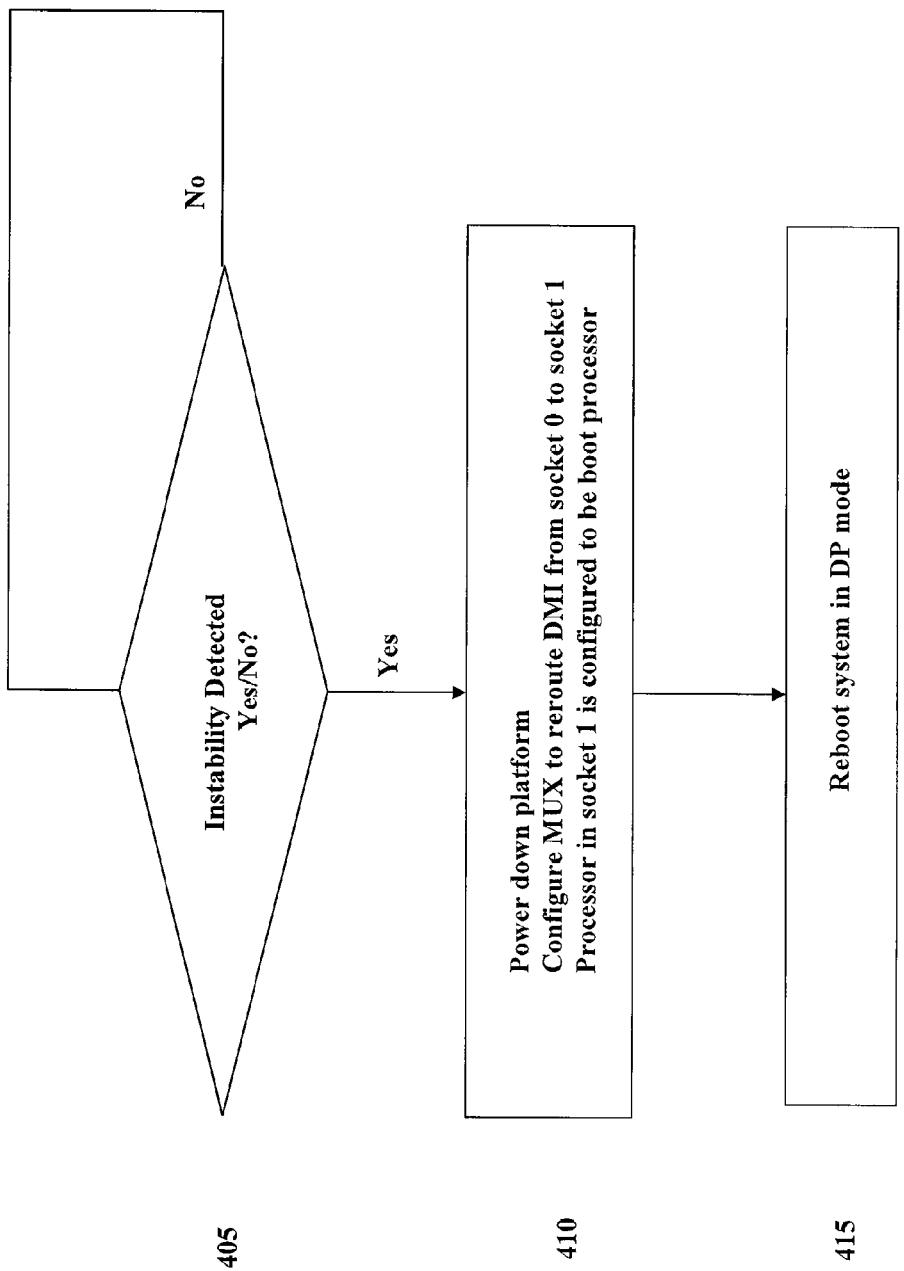
FIG. 4 shows an example flowchart for switching from a DP to DP architecture in accordance with various aspects of the present disclosure.

FIG. 4 shows an example flowchart for switching from a DP to DP architecture in accordance with various aspects of the present disclosure. The process begins at 405 where the monitor 220, 330 is configured to detect a condition, such as instabilities in the operational status of the processors. If no instability is detected, the process loop back to 405, where a detected instability leads to 410. At 410, the platform is powered down and the MUX reroutes DMI from socket 0 to socket 1. The processor in socket 1 is then configured to be the boot processor. At 415, the system is reboot in DP mode, where the platform is booted using the rerouted processor in socket 1.

Figure 5:
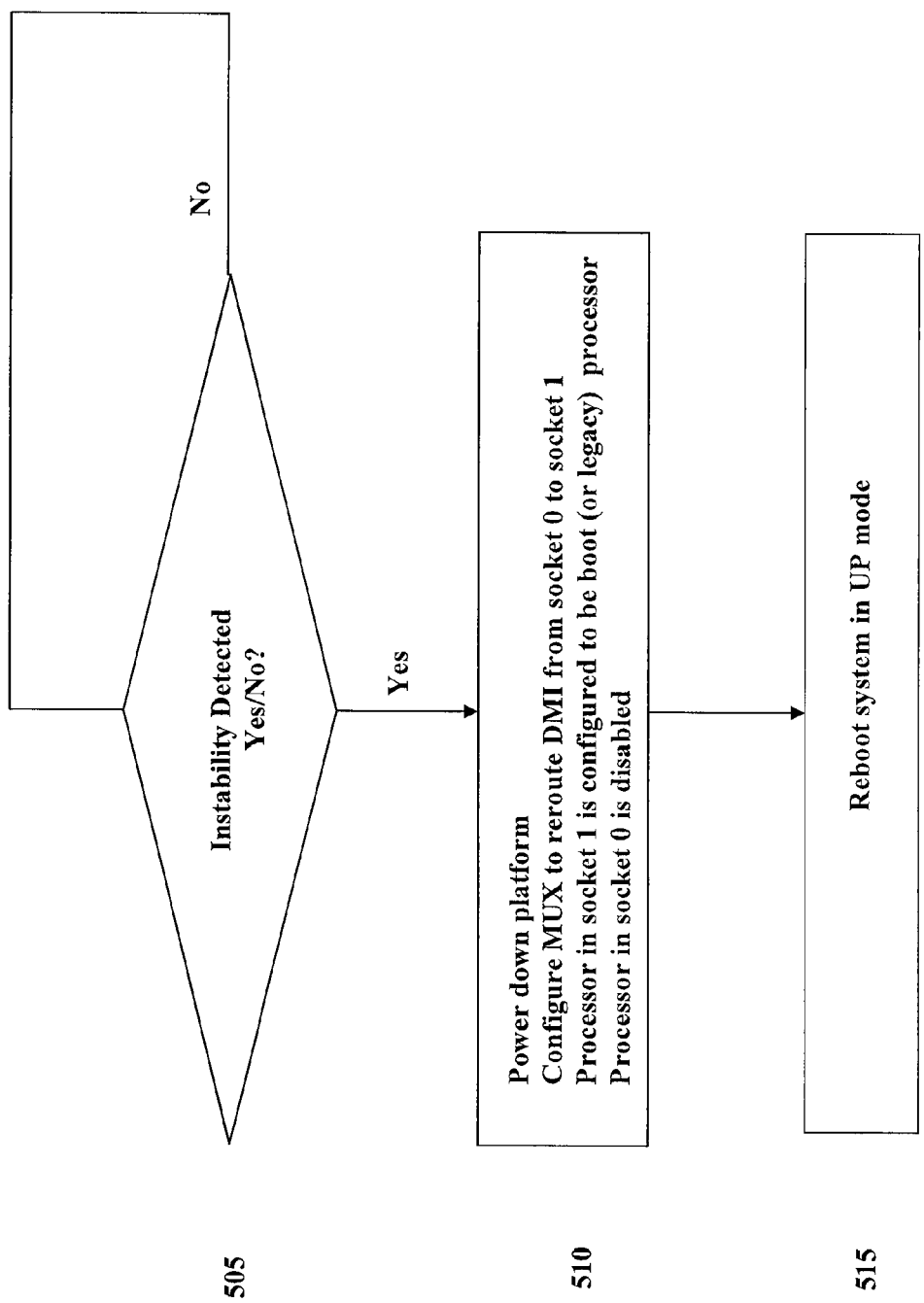
FIG. 5 shows an example flowchart for switching from a DP to a unitary processor (UP) architecture in accordance with various aspects of the present disclosure.

FIG. 5 shows an example flowchart for switching from a DP to a unitary processor (UP) architecture in accordance with various aspects of the present disclosure. The process begins at 505 where the monitor 220, 330 is configured to detect a condition, such as instabilities in the operational status of the processors. If no instability is detected, the process loop back to 505, where a detected instability leads to 510. At 510, the platform is powered down and the MUX reroutes DMI from socket 0 to socket 1. The processor in socket 1 is then configured to be the boot or legacy processor and the processor in socket 0 is disabled. At 515, the system is reboot in UP mode, where the platform is booted using the rerouted processor in socket 1.

What is being claimed:

1. A method comprising:
monitoring, by a monitoring module, a first processor of a computer for a first processor instability, wherein the first processor instability includes a pre-boot and a post-boot instability in the computer;
determining if the first processor is stable based on the monitoring;
multiplexing a communication from an interface to the first processor if the first processor is determined to be stable; and
multiplexing the communication from the interface to a second processor of the computer if the first processor is determined not to be stable,
wherein the first processor and the second processor are in communication by a processor interconnect.

2. The method according to claim 1, wherein the monitoring module comprises a watchdog timer, a baseboard management controller, any combination thereof.

3. The method according to claim 1, wherein the pre-boot instability includes instability of a power supply or a timing mechanism.

4. The method according to claim 1, wherein the post-boot instability includes a computer operation exceeding a threshold duration or a threshold number of memory errors.

5. The method according to claim 1, wherein the communication from the interface includes a command or data related to booting the computer.

6. The method according to claim 1, wherein the interface is communicatively connected to a platform controller hub (PCH).

7. The method according to claim 1, wherein the computer includes a third processor and a fourth processor, and wherein the multiplexing the communication from the interface to the second processor is further in response to determining that the third processor is not stable and the fourth processor is not stable.

8. The method according to claim 1, wherein the multiplexing the communication from the interface to the second processor includes configuring the first processor to instruct a multiplexer module to route communications from the interface to the second processor.

9. An apparatus comprising:
a first processor;
a second processor communicatively connected to the first processor through an interconnect;
a monitor configured to monitor a condition of the first processor and a condition of the second processor, wherein the monitor is configured to detect a pre-boot and a post-boot instability in the first processor or the second processor; and
a multiplexer configured to route a communication from an interface to the first processor if the first processor is determined to be stable, and to route the communication from the interface to the second processor if the first processor is determined not to be stable.

10. The apparatus according to claim 9, further comprising: a controller configured to select based on the monitored condition which processor is the boot processor, wherein the controller is configured to select from at least the first processor and the second processor.

11. The apparatus according to claim 9, wherein the interconnect is a point-to-point processor interconnect.

12. The apparatus according to claim 9, wherein the monitor comprises a watchdog timer, a baseboard management controller, or any combination thereof.

13. The apparatus according to claim 9, wherein the pre-boot instability includes instability of a power supply or a timing mechanism.

14. The apparatus according to claim 9, wherein the post-boot instability includes a computer operation exceeding a threshold duration, a threshold number of memory errors, or any combination thereof.

15. The apparatus of claim 9, further comprising a third processor and a fourth processor, wherein the multiplexer is further configured to select between routing the communication from the interface to one of the second, third, and fourth processors based on whether the first processor is not stable.

16. The apparatus according to claim 9, wherein the interface is communicatively connected to a platform controller hub (PCH).

17. The apparatus according to claim 9, wherein communication includes a command or data related to booting the computer.

* * * * *